(12) United States Patent
Krishnaswamy et al.

(10) Patent No.: US 9,068,847 B2
(45) Date of Patent: Jun. 30, 2015

(54) SYSTEM AND METHOD FOR COLLABORATIVE NAVIGATION

(75) Inventors: Kailash Krishnaswamy, Little Canada, MN (US); Randolph G. Hartman, Plymouth, MN (US); Wayne A. Soehren, Wayzata, MN (US)

(73) Assignee: Honeywell International Inc., Morristown, NJ (US)

( * ) Notice: Subject to any disclaimer, the term of this patent is extended or adjusted under 35 U.S.C. 154(b) by 685 days.

(21) Appl. No.: 12/428,358

(22) Filed: Apr. 22, 2009

(65) Prior Publication Data

US 2010/0274481 A1    Oct. 28, 2010

(51) Int. Cl.
G01C 21/28 (2006.01)
G01C 21/16 (2006.01)
G01S 5/00 (2006.01)
G01S 5/16 (2006.01)
G01S 19/47 (2010.01)

(52) U.S. Cl.
CPC .............. *G01C 21/28* (2013.01); *G01C 21/165* (2013.01); *G01S 5/0072* (2013.01); *G01S 5/16* (2013.01); *G01S 19/47* (2013.01)

(58) Field of Classification Search
USPC .................. 701/200–226, 300–302, 400–541
See application file for complete search history.

(56) References Cited

U.S. PATENT DOCUMENTS

| | | | |
|---|---|---|---|
| 5,646,844 A * | 7/1997 | Gudat et al. | 701/208 |
| 6,474,159 B1 | 11/2002 | Foxlin et al. | |
| 6,922,632 B2 * | 7/2005 | Foxlin | 701/207 |
| 7,242,460 B2 | 7/2007 | Hsu et al. | |
| 2006/0136127 A1 | 6/2006 | Coch et al. | |
| 2008/0009965 A1 * | 1/2008 | Bruemmer et al. | 700/245 |

OTHER PUBLICATIONS

European Patent Office, "Office Action", "from Foreign Counterpart of U.S. Appl. No. 12/428,358", Feb. 15, 2013, pp. 1-5, Published in: EP.
European Patent Office, "European Search Report", "from Foreign Counterpart of U.S. Appl. No. 12/428,358", Feb. 1, 2013, pp. 1-3, Published in: EP.
Bingham et al., "Vision-Aided, Cooperative Navigation for Multiple Unmanned Vehicles", "ION 2009 International Technical Meeting", Jan. 2009, pp. 804-813.
Merino et al., "Vision-Based Multi-UAV Position Estimation", "IEEE Robotics & Automation magazine", Sep. 2006, pp. 53-62, vol. 13, No. 3.

(Continued)

*Primary Examiner* — Michael Misiaszek
(74) *Attorney, Agent, or Firm* — Fogg & Powers LLC (57) ABSTRACT

A system and method for collaborative navigation is provided. The system comprises a first mobile unit, at least one inertial measurement unit on the first mobile unit, and at least one environment sensor on the first mobile unit. A navigator module in the first mobile unit is configured to receive inertial data from the inertial measurement unit. An object characterization module is configured to receive sensor data from the environment sensor and a navigation solution from the navigator module. A common object geo-locator module is configured to receive a first set of descriptors from the object characterization module and a second set of descriptors from another mobile unit. A data association module is configured to receive common descriptors from the common object geo-locator module. The first mobile unit is configured to operatively communicate with one or more additional mobile units that are configured for collaborative navigation with the first mobile unit.

18 Claims, 4 Drawing Sheets

(56) References Cited

OTHER PUBLICATIONS

Roumeliotis et al., "Distributed Multirobot Localization", "IEEE Transactions on Robotics and Automation", Oct. 2002, pp. 781-795, vol. 18, No. 5.
Sharma et al., "Vision Based Distributed Cooperative Navigation for MAVs in GPS Denied Areas", Apr. 2009, pp. 1-16.
State of Israel Ministry of Justice the Patent Office, "Office Action", "from Foreign Counterpart of U.S. Appl. No. 12/428,358", Sep. 3, 2013, pp. 1-6, Published in: IL.
European Patent Office, Communication under Rule 71(3) from EP Application No. 10159573.4 mailed Feb. 24, 2014, from Foreign Counterpart of U.S. Appl. No. 12/428,358, Feb. 24, 2014, pp. 1-8, Published in: EP.
European Patent Office, European Search Report from EP Application No. 14161305.9, from Foreign Counterpart of U.S. Appl. No. 12/428,358, mailed May 20, 2014, pp. 1-4, Published in: EP.
European Patent Office, "Office Action from EP Application No. 14161305.9 mailed Aug. 21, 2014", from Foreign Counterpart of U.S. Appl. No. 12/428,358, Aug. 21, 2014, pp. 1-4, Published in: EP.
Frew, "Flight Demonstrations of Self-directed Collaborative Navigation of Small Unmanned Aircraft", Sep. 2004, pp. 1-14, Publisher: American Institute of Aeronautics and Astronautics.
Kumar, Ray et al., "Sonar-Based Rover Navigation for Single or Multiple Platforms: Forward Safe Path and Target Switching Approach", "IEEE Systems Journal", Jun. 2008, pp. 699-710, vol. 2, No. 2, Publisher: IEEE.
Lederer et al., "Collaborative Location Certification for Ad-Hoc Sensor Networks", "IEEE Sarnoff Symposium", Apr. 2008, pp. 1-6, Publisher: IEEE.
Saptharishi et al., "Distributed Surveillance and Reconnaissance Using Multiple Autonomous ATVs: CyberScout", "IEEE Transactions on Robotics and Automation: Special Issue on Multi-Robot Systems", Mar. 2001, pp. 1-11, Publisher: IEEE.
Zhao et al., "Collaborative Effects of Mobile Sensor Network Localization Through Distributed Multimodal Navigation Sensor Fusion", "2008 ION National Technical Meeting", Jan. 28, 2008.

\* cited by examiner

SYSTEM AND METHOD FOR COLLABORATIVE NAVIGATION

BACKGROUND

The development of navigation solutions in the absence of Global Positioning System (GPS) signals is receiving much attention from both commercial and military organizations. A navigation system that provides accurate information in the absence of a GPS signal is useful in first responder applications, as well as military operations in urban areas.

Inertial navigation systems are used in civil and military applications, in both manned and unmanned vehicles. A typical Inertial Navigation System (INS) includes an Inertial Measurement Unit (IMU) combined with processing to determine the navigation state of the system, which may include position, velocity, and attitude. An IMU includes inertial sensors or instruments such as accelerometers and/or gyroscopes for detecting and measuring inertial motion and acceleration in multiple directions.

Conventional navigation systems use indigenous sensors to determine the best estimate of a navigation solution. In certain environments, such navigation systems degrade in performance due to unavailability of a class of measurements. By communicating with other navigation systems in the vicinity, it is possible to recapture acceptable performance and sometimes improve indigenous sensor aided performance.

SUMMARY

The present invention relates to a system and method for collaborative navigation. The system comprises a first mobile unit, at least one inertial measurement unit on the first mobile unit, and at least one environment sensor on the first mobile unit. A navigator module in the first mobile unit is configured to receive inertial data from the inertial measurement unit. An object characterization module is configured to receive sensor data from the environment sensor and a navigation solution from the navigator module. A common object geo-locator module is configured to receive a first set of descriptors from the object characterization module and a second set of descriptors from another mobile unit. A data association module is configured to receive common descriptors from the common object geo-locator module. The first mobile unit is configured to operatively communicate with one or more additional mobile units that are configured for collaborative navigation with the first mobile unit.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

The present invention is directed to a system and method for collaborative navigation between multiple navigation systems, which leads to improved navigation solutions for each of the navigation systems. In the present approach, each navigation system communicates with one or more other navigation systems in a given area to exchange state information. This leads to a better estimate of the navigation solution for a navigation system on a single mobile platform such as on a vehicle or a person, which improves the accuracy of the navigation system.

The present collaborative navigation approach can be implemented in navigation systems utilizing a Global Navigation Satellite System (GNSS), such as the Global Positioning System (GPS), as well as an inertial navigation system (INS) that employs an inertial measurement unit (IMU). For example, the present approach can be implemented in a cooperative navigation system having tightly coupled INS/GPS navigation components. The present approach can also be implemented in an INS navigation system with one or more IMUs and no GPS receivers.

The present collaborative approach can be applied to display navigation systems, personnel navigation systems, and GPS-denied vehicle navigation. For example, the collaborative navigation system and method can be implemented in ground vehicles or air vehicles operating in GNSS challenging environments, or in soldier situation awareness/navigation/communication systems, where GNNS-denied operation is problematic such as in urban environments.

The present collaborative navigation method can be implemented into standard navigation software. For example, the collaborative navigation method can be incorporated into a SLAM (Simultaneous Localization and Mapping) navigation process used by numerous autonomous vehicle platforms for navigating to a destination while simultaneously generating a map of surrounding terrain. The SLAM navigation process is indifferent with respect to various sensor technologies and typically comprises a filter to generate a map that contains "features" or processed sensor returns of the surrounding terrain.

The collaborative navigation approach provides improved individual navigation accuracy using common features that can be sensed by each unit in a group. For example, the collaborative navigation method involves sharing localization states of commonly observed features between multiple navigation systems, such as those used by multiple teams on a mission such as soldiers in a platoon.

In a direct measurement mode of collaborative navigation, relative navigation to other units in a group can be provided. In an indirect measurement mode, relative navigation to commonly observable features can be provided between units in the group.

Figure 1A:
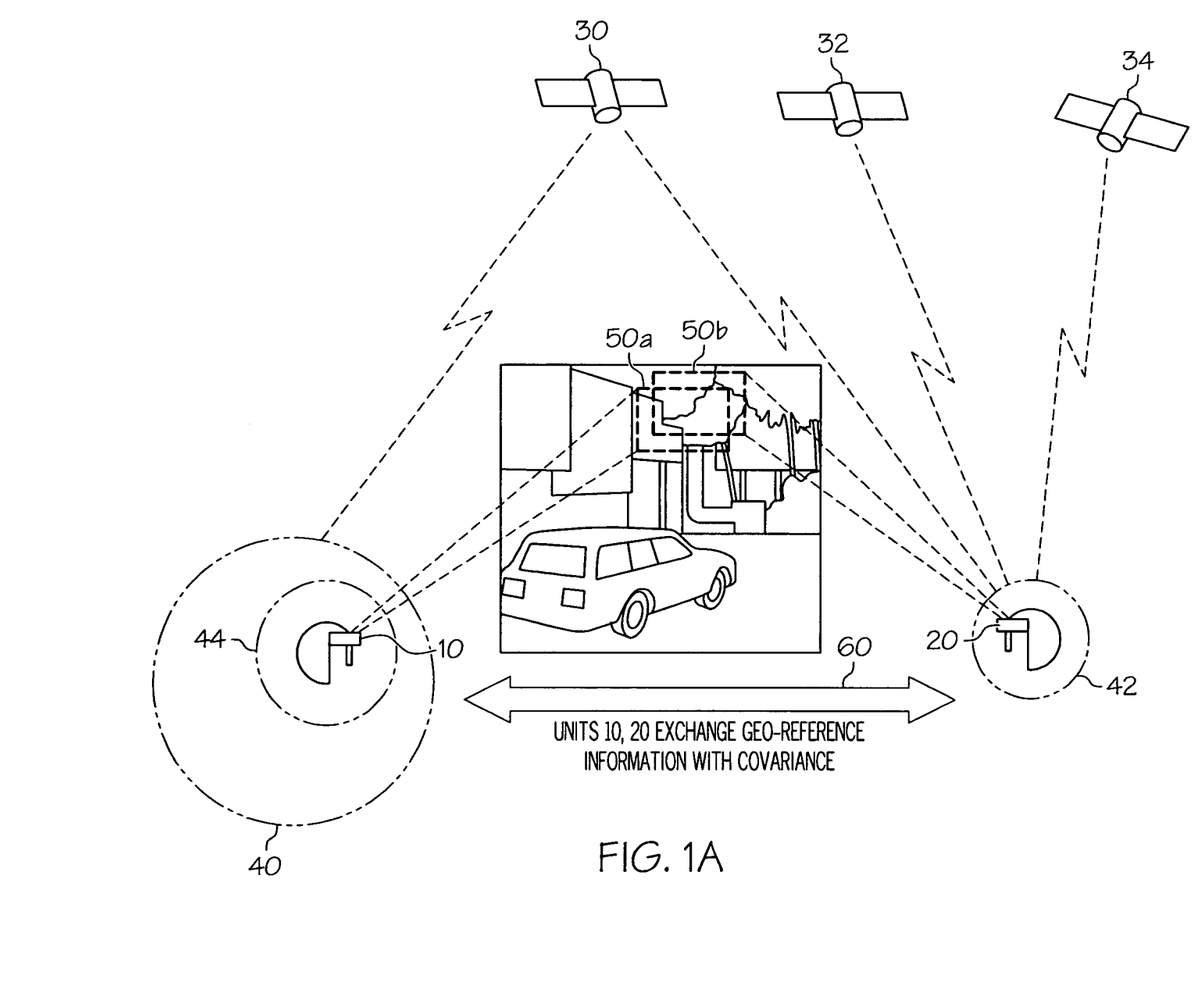
FIG. 1A depicts an exemplary implementation of a collaborative navigation system and method according to one embodiment of the invention.

FIG. 1A depicts an exemplary implementation of the collaborative navigation system and method using an indirect measurement mode. A first unit 10 and a second unit 20, each with there own navigation system, such as a coupled INS/

GPS navigation system on a mobile platform such as a vehicle or person, are deployed in the same general area in a locality but separated by a given distance. Each of the navigation systems of first unit 10 and second unit 20 is in operative communication with one or more GPS satellites 30, 32, or 34.

Figure 1B:
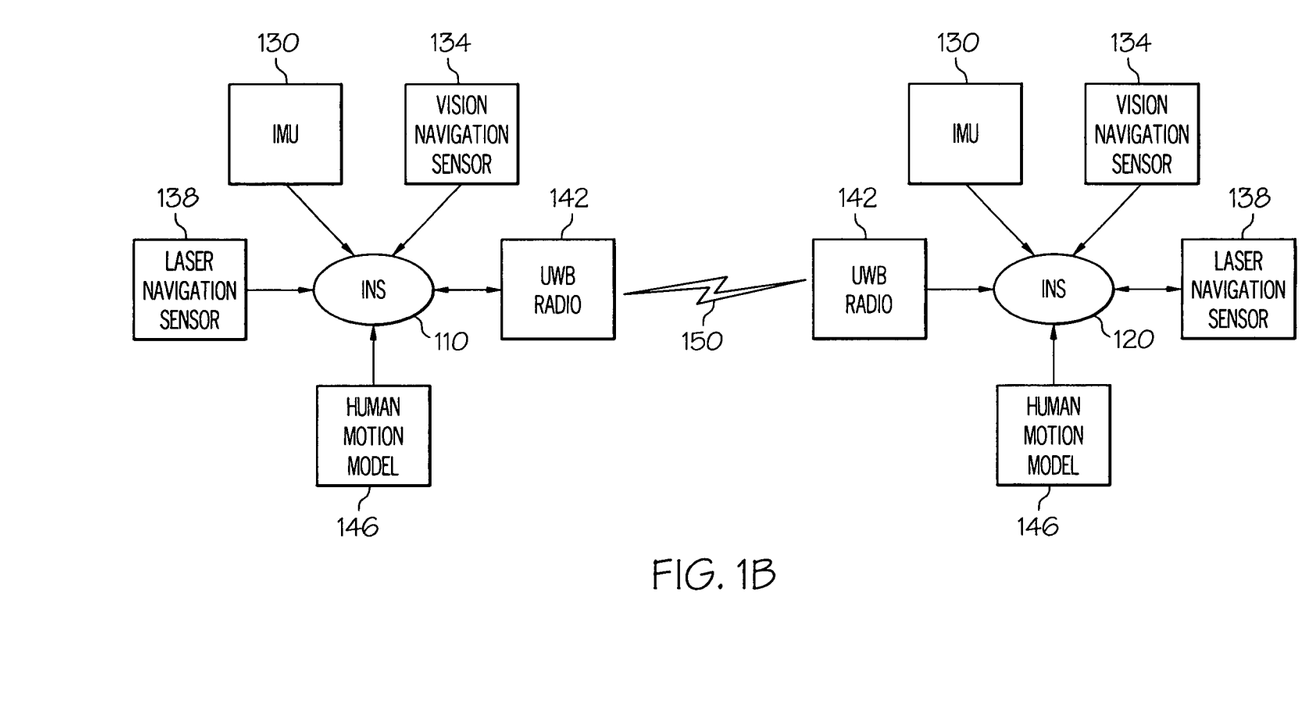
FIG. 1B shows various data input devices for providing navigation and environmental data to a navigation system that employs collaborative navigation.

Each of units 10 and 20 can be implemented with various data input devices that provide various navigation and environmental data to the INS portion of the navigation system in each unit. As illustrated in FIG. 1B, an INS 110 and an INS 120 can be separately implemented in each unit. In general, the INS 110 and INS 120 receive data input from one or more of a micro-electro-mechanical system (MEMS) IMU 130, and one or more environment sensors. The environment sensors can include one or more of a vision navigation sensor 134 (e.g., high-speed digital camera), a laser navigation sensor 138 such as a laser detection and ranging (LADAR) sensor, a radio ranging sensor such as an ultra-wideband (UWB) radio 142, or the like. A human motion model 146, such as those known to one skilled in the art, can also provide input data to INS 110 and INS 120. As described further hereafter, INS 110 and INS 120 exchange geo-reference information with uncertainty as indicated at 150.

Before collaborative navigation occurs, unit 10 has a prior navigation accuracy 40 indicated by the dot-dash line surrounding unit 10, and unit 20 has a prior navigation accuracy 42 indicated by the dot-dash line surrounding unit 20. As shown in FIG. 1A, the prior navigation accuracy 40 of unit 10 has a wider variability (larger circle—less accurate) than prior navigation accuracy 42 of unit 20 (smaller circle—more accurate).

During operation of collaborative navigation, unit 10 receives a visual image 50a or other input data related to a specified feature or target (e.g., the second floor window in a building), and unit 20 receives a visual image 50b or other data related to the same feature at a different position and angle compared to unit 10. The units 10 and 20 exchange geo-reference information related to the feature or target with uncertainty, such as indicated at 60 in FIG. 1A. Since each of the navigation systems of units 10 and 20 has its own uncertainty of the geo-referenced feature 50, by sharing the uncertainty information, the best estimate of the geo-reference of the feature or target will be determined. For example, by using the uncertainty information from unit 20, the prior navigation accuracy 40 of unit 10 can be improved to a navigation accuracy 44 indicated by the smaller dot-dash line surrounding unit 10 in FIG. 1A.

The collaborative navigation approach benefits from the fusion of a temporal distribution of multiple estimates of common landmarks. For example, the collaborative navigation system of unit 10 will communicate the most likely observable features to unit 20 and any other units in the area. These features are then time tagged and stored in the map database of the SLAM of the other units, and can then be used whenever the features are observed by the vision sensor of a unit to improve navigation accuracy.

Figure 2:
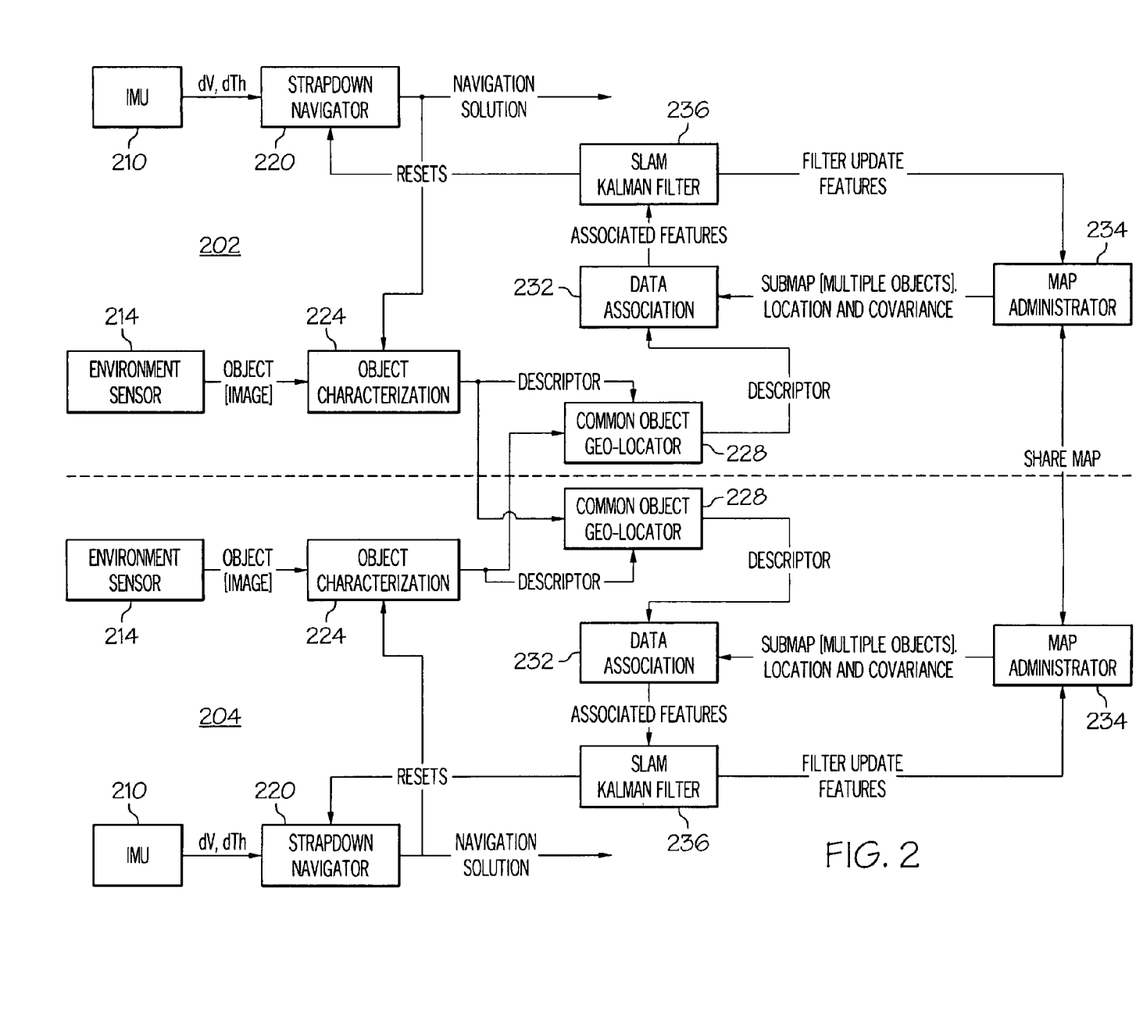
FIG. 2 depicts a block diagram of a system architecture for collaborative navigation according to one implementation.

FIG. 2 illustrates the system architecture for the present collaborative navigation approach according to one implementation. While FIG. 2 shows the system architecture for two units on separate platforms each implemented with collaborative navigation, it should be understood that additional units on separate platforms can be employed in such a system using the same components.

As shown in FIG. 2, a unit 202 and a unit 204 each includes at least one IMU 210 and at least one environment sensor 214 mounted on separate platforms. The IMU 210 in each unit outputs inertial data including a change in velocity (dV) and a change in angle (dTh). The inertial data is received by a navigator module 220, such as a strapdown navigator, in each unit that is configured to process the inertial data. The navigator module 220 is rigidly fixed to each unit and can be implemented in a standard manner as known to those skilled in the art. The navigator module 220 is configured to output a navigation solution, which can be transmitted to an object characterization module 224 as well as to the INS of the unit for further processing.

The environment sensor 214 in each unit transmits sensor data such as object (image) data to object characterization module 224 in each unit. The environment sensors can include vision sensors, LADAR sensors, radio ranging sensors, radar sensors, ultrasonic sensors, or the like, either singly or in various combinations on each platform of a unit.

It should be noted that the object sensed could be another unit. In this case, an additional output from the sensor would be the range to the other unit, which could be used in a direct measurement mode.

After each object characterization module 224 receives object data inputs from a respective environment sensor 214, such as an image captured by a vision sensor, object characterization module 224 can process the data in various ways. For example, object characterization module 224 can determine most-likely object identification such as through heuristics. The object characterization module 224 can also perform object feature extraction such as by using a Scale Invariant Feature Transform (SIFT) algorithm, a Speeded-Up Robust Features (SURF) algorithm, or the like, as known to those skilled in the art. The SIFT and SURF feature extraction algorithms use specific spatial filters (difference of Gaussians and Laplacians, respectively) at multiple scales of an image to extract features. Object localization can also be determined using the navigation solution received by each object characterization module 224 from navigator module 220 in each unit.

Each object characterization module 224 outputs a set of descriptors to a common object geo-locator module 228 in each unit. The descriptors are transmitted to both the given unit's common object geo-locator module and to the other unit's common object geo-locator module as indicated in FIG. 2. The descriptors can include object data, object features, object location, and object uncertainty.

Each common object geo-locator module 228 provides the functions of feature matching and estimation. For example, the common object geo-locator module 228 in each unit is operative to provide common object extraction from the descriptors received from each of the units, perform correlation between objects to determine common objects, and determine the best estimate of the common object location and uncertainty.

A set of common descriptors is output from each unit's common object geo-locator module 228 to a data association module 232 in the unit. The common descriptors can include common object data, common features, best estimate of common object location, and uncertainty. A map administrator 234 in each unit outputs local map data such as a unit sub-map (multiple objects), location data, and uncertainty data to each data association module 232. The map administrator 234 in each unit can also share map data with the other map administrator in the other unit to update the common part of the map that is shared between units.

Each data association module 232 is operative to perform correlation of the common descriptors with the map data using common features. The data association module 232 in each unit also determines: 1) an estimate of correction in rotation and translation between the common descriptors and the map objects; or 2) the associated objects.

The output from each data association module 232 can include associated features and/or navigation corrections, which are transmitted to a filter 236 such as a SLAM Kalman filter in each unit. Each filter 236 can send a reset signal to navigator module 220 in the respective unit, and outputs filter update features to the map administrator 234 in the unit.

Figure 3:
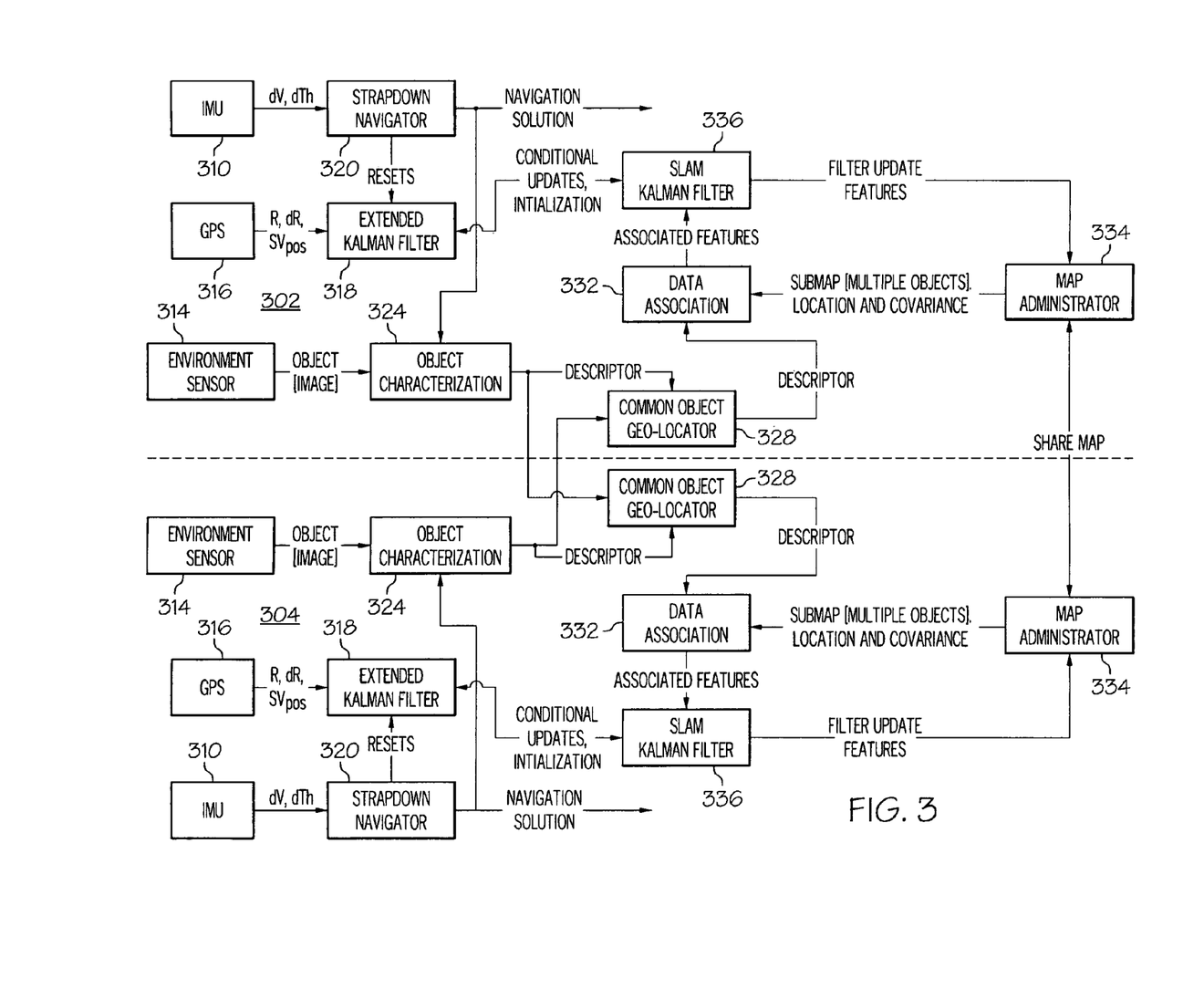
FIG. 3 depicts a block diagram of a system architecture for collaborative navigation according to another implementation.

FIG. 3 depicts the system architecture for the present collaborative navigation approach according to another implementation, which includes similar components as described above with respect to FIG. 2 but adds a GPS function. While FIG. 3 shows the system architecture for two units on separate platforms each implemented with collaborative navigation, it should be understood that additional units on separate platforms can be employed in such a system using the same components.

As shown in FIG. 3, a unit 302 and a unit 304 each includes at least one IMU 310 and at least one environment sensor 314 mounted on separate platforms. In addition, each of units 302 and 304 include a GPS receiver 316.

The IMU 310 in each of the units outputs inertial data (dV, dTh) to a navigator module 320, such as a strapdown navigator, in each unit that is configured to process the inertial data. The navigator module 320 is configured to output a navigation solution, which can be transmitted to an object characterization module 324 in the unit as well as to the INS of the unit for further processing. The environment sensor 314 in each unit transmits sensor data such as object (image) data to object characterization module 324 in each unit. The environment sensor 314 can be the same as those described previously for sensor 214.

The GPS receiver 316 in each of units 302 and 304 outputs positioning data including R, dR, and $SV_{pos}$ to an extended filter 318, such as an extended Kalman filter, in each unit. Each extended filter 318 can receive a reset signal from navigator module 320 in the unit.

After each object characterization module 324 receives object data inputs from a respective environment sensor 314, object characterization module 324 can process the data in various ways. For example, object characterization module 324 can determine most-likely object identification, and perform object feature extraction such as by using SIFT or SURF algorithms as discussed previously. Object localization can also be determined using the navigation solution received by object characterization module 324 from navigator module 320.

Each object characterization module 324 outputs a set of descriptors to a common object geo-locator module 328 in each unit. The descriptors are transmitted to both the given unit's common object geo-locator module and to the other unit's common object geo-locator module as indicated in FIG. 3. The descriptors can include object data, object features, object location, and object uncertainty. Each common object geo-locator module 328 provides the functions of feature matching and estimation as discussed previously for common object geo-locator module 228.

A set of common descriptors is output from each unit's common object geo-locator module 328 to a data association module 332 in the unit. The common descriptors can include common object data, common features, best estimate of common object location, and uncertainty. A map administrator 334 in each unit outputs local map data such as a unit submap, location data, and uncertainty data to each data association module 332. The map administrator 334 in each unit can also share map data with the other map administrator in the other unit.

Each data association module 332 is operative to perform correlation of the common descriptors with the map data using common features. The data association module 332 in each unit also determines: 1) an estimate of correction in rotation and translation between the common descriptors and the map objects; or 2) the associated objects.

The output from each data association module 332 can include associated features and/or navigation corrections, which is transmitted to a first filter 336, such as a SLAM Kalman Filter, in each unit. Each filter 336 can send and receive conditional updates and initialization signals to and from a second filter 318 in the unit. Each filter 336 also outputs filter update features to the map administrator 334 in the unit.

Instructions for carrying out the various process tasks, calculations, and generation of signals and other data used in the operation of the methods of the invention can be implemented in software, firmware, or other computer readable instructions. These instructions are typically stored on any appropriate computer readable media used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code in the form of computer executable instructions or data structures. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

The method of the invention can be implemented in computer readable instructions, such as program modules or applications, which are executed by a data processor. Generally, program modules or applications include routines, programs, objects, data components, data structures, algorithms, or the like, which perform particular tasks or implement particular abstract data types.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for collaborative navigation, the system comprising:
   a first mobile unit;
   at least one inertial measurement unit on the first mobile unit;
   at least one environment sensor on the first mobile unit configured to detect one or more objects in an environment;
   a navigator module configured to receive inertial data from the inertial measurement unit;

an object characterization module configured to receive sensor data related to the one or more objects from the environment sensor and a navigation solution from the navigator module;

a common object geo-locator module configured to receive a first set of descriptors from the object characterization module and a second set of descriptors from another object characterization module of another mobile unit, the first and second sets of descriptors including object data, object features, object location, and object uncertainty, wherein the common object geo-locator module is operative to perform common object extraction from the first and second sets of descriptors, perform correlation between objects to determine common objects, and determine a best estimate of the common object location and uncertainty; and a data association module configured to receive common descriptors from the common object geo-locator module;

wherein the first mobile unit is configured to operatively communicate with one or more additional mobile units that are configured for collaborative navigation with the first mobile unit.

2. The system of claim 1, further comprising a first filter configured to receive associated features or navigation correction data from the data association module, and to output a reset signal to the navigator module.

3. The system of claim 2, further comprising a map administrator configured to receive filter update features from the first filter, and to output local map data to the data association module.

4. The system of claim 2, further comprising a Global Positioning System (GPS) receiver on the mobile unit.

5. The system of claim 4, further comprising a second filter in operative communication with the first filter, and configured to receive positioning data from the GPS receiver.

6. The system of claim 1, wherein the environment sensors comprise one or more vision sensors, laser detection and ranging sensors, radio ranging sensors, radar sensors, ultrasonic sensors, or various combinations thereof.

7. The system of claim 1, wherein the object characterization module is operative to determine a most-likely object identification, perform object feature extraction, and determine object localization based on the navigation solution.

8. The system of claim 3, wherein the map data comprises at least location and uncertainty of objects.

9. The system of claim 8, wherein the data association module is configured to perform correlation of the common descriptors and map data using common features, and determine:

(a) an estimate of correction in rotation and translation; or
(b) associated objects.

10. The system of claim 1, further comprising:
a second mobile unit;
at least one inertial measurement unit on the second mobile unit;
at least one environment sensor on the second mobile unit configured to detect one or more objects in the environment;
a navigator module in the second mobile unit configured to receive inertial data from the inertial measurement unit on the second mobile unit;
an object characterization module in the second mobile unit configured to receive sensor data related to the one or more objects from the environment sensor on the second mobile unit and a navigation solution from the navigator module in the second mobile unit;

a common object geo-locator module in the second mobile unit configured to receive the first set of descriptors from the object characterization module in the first mobile unit and a second set of descriptors from the object characterization module of the second mobile unit, the first and second sets of descriptors including one more of object data, object features, object location, or object uncertainty; and a data association module in the second mobile unit configured to receive common descriptors from the common object geo-locator module of the second mobile unit.

11. The system of claim 10, further comprising a map administrator on the second mobile unit in operative communication with the map administrator on the first mobile unit so as to update the common part of the map that is shared between mobile units.

12. The system of claim 10, wherein the common object geo-locator module on the first mobile unit is configured to receive the second set of descriptors from the object characterization module on the second mobile unit.

13. The system of claim 10, further comprising a GPS receiver on the second mobile unit.

14. A method of collaborative navigation, the method comprising:
providing at least a first mobile unit and a second mobile unit, each of the mobile units including:
at least one inertial measurement unit;
at least one environment sensor that detects one or more objects in an environment;
a navigator module that receives inertial data from the inertial measurement unit;
an object characterization module in operative communication with the environment sensor and the navigator module; and
a common object geo-locator module in operative communication with the object characterization module in each mobile unit, the common object geo-locator module operative to perform common object extraction from descriptor information, perform correlation between objects to determine common objects, and determine a best estimate of the common object location and uncertainty;
inputting sensor data related to a target object into the object characterization module in each mobile unit from the inertial measurement unit and the environment sensor of the respective mobile unit;
inputting descriptor information related to the target object from the object characterization module in each mobile unit into the common object geo-locator modules of each mobile unit, the descriptor information including object data, object features, object location, and object uncertainty;
exchanging geo-reference information related to the target object between the mobile units; and
determining a best estimate of the geo-reference of the target object.

15. The method of claim 14, wherein the first and second mobile units are configured to operatively communicate with one or more additional mobile units that are configured for collaborative navigation with the first and second mobile units.

16. The method of claim 14, wherein at least one of the first and second mobile units further comprise a GPS receiver that outputs positioning data.

17. A method of collaborative navigation, the method comprising:
- deploying at least a first mobile unit and a second mobile unit in a location of one or more target objects, the first and second mobile units each comprising at least one inertial measurement unit and at least one environment sensor;
- inputting sensor data related to the one or more target objects into an object characterization module in each of the mobile units from the inertial measurement unit and the environment sensor in each of the mobile units;
- inputting descriptor information related to the one or more target objects from the object characterization module in each of the mobile units into a common object geo-locator module in each of the mobile units, the descriptor information including object data, object features, object location, and object uncertainty, wherein the common object geo-locator module in each of the mobile units performs common object extraction from the descriptor information, performs correlation between objects to determine common objects, and determines a best estimate of the common object location and uncertainty;
- exchanging geo-reference information related to the one or more target objects between the first and second mobile units; and
- determining a best estimate of the geo-reference of the one or more target objects.

18. The method of claim 17, wherein at least one of the first and second mobile units is in operative communication with one or more GPS satellites.

* * * * *